United States Patent
Chelian

(10) Patent No.: US 10,431,107 B2
(45) Date of Patent: Oct. 1, 2019

(54) SMART NECKLACE FOR SOCIAL AWARENESS

(71) Applicant: Toyota Motor Engineering & Manufacturing North America, Inc., Erlanger, KY (US)

(72) Inventor: Suhas E. Chelian, San Jose, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 156 days.

(21) Appl. No.: 15/451,602

(22) Filed: Mar. 7, 2017

(65) Prior Publication Data

US 2018/0261114 A1    Sep. 13, 2018

(51) Int. Cl.
  *G06K 9/00*    (2006.01)
  *G09B 5/00*    (2006.01)

(52) U.S. Cl.
  CPC .......... *G09B 5/00* (2013.01); *G06K 9/00288* (2013.01); *G06K 9/00302* (2013.01); *G06K 2009/00322* (2013.01)

(58) Field of Classification Search
  CPC ......... G06F 3/016; G09B 5/00; G09B 21/003; G06K 9/00288; G06K 9/00255; G06K 9/00308; G06K 9/00268; G06K 9/00302
  See application file for complete search history.

(56) References Cited

U.S. PATENT DOCUMENTS

| 9,472,207 | B2 | 10/2016 | Gondi et al. | |
| 9,716,599 | B1* | 7/2017 | Gates | G06Q 10/063 |
| 2008/0267459 | A1* | 10/2008 | Nakada | G09B 19/00 382/118 |
| 2012/0316676 | A1* | 12/2012 | Fouillade | B25J 11/0005 700/246 |
| 2013/0162524 | A1* | 6/2013 | Li | G06K 9/00 345/156 |
| 2013/0245396 | A1 | 9/2013 | Berman et al. | |

(Continued)

OTHER PUBLICATIONS

Happy, S. L., Anirban Dasgupta, Priyadarshi Patnaik, and Aurobinda Routray. "Automated alertness and emotion detection for empathic feedback during e-Learning." In Technology for Education (T4E), 2013 IEEE Fifth International Conference on, pp. 47-50. IEEE, 2013. (Year: 2013).*

(Continued)

*Primary Examiner* — Carol Wang
(74) *Attorney, Agent, or Firm* — Dinsmore & Shohl LLP

(57) ABSTRACT

A device for providing feedback includes an imaging device configured to capture an image of a subject, a feedback device, and a controller communicatively coupled to the imaging device and the feedback device. The controller includes at least one processor and at least one memory storing computer readable and executable instructions that, when executed by the processor, cause the controller to determine one or more identifying characteristics of the subject, set one or more parameters for determining a facial expression of the subject in the image based on the one or more identifying characteristics of the subject, determine the facial expression of the subject in the image based on the one or more parameters, and provide the feedback with the feedback device based on the determined facial expression.

17 Claims, 7 Drawing Sheets

(56) References Cited

U.S. PATENT DOCUMENTS

| | | | | |
|---|---|---|---|---|
| 2013/0337421 | A1* | 12/2013 | Gerken, III | G09B 5/00 434/236 |
| 2014/0178048 | A1* | 6/2014 | Chen | H04N 21/4415 386/261 |
| 2014/0280296 | A1* | 9/2014 | Johnston | G06F 17/30011 707/769 |
| 2014/0330684 | A1* | 11/2014 | Mizui | G06Q 30/02 705/27.2 |
| 2015/0157255 | A1* | 6/2015 | Nduka | A61B 5/165 600/301 |
| 2015/0201181 | A1 | 7/2015 | Moore et al. | |
| 2015/0250420 | A1* | 9/2015 | Longinotti-Buitoni | A61B 5/6804 600/301 |
| 2015/0279369 | A1* | 10/2015 | Lee | G06K 9/00288 704/275 |
| 2016/0086088 | A1* | 3/2016 | Yehezkel | G06K 9/00335 706/11 |
| 2016/0234572 | A1* | 8/2016 | Dixit | G08B 21/0423 |
| 2016/0275518 | A1* | 9/2016 | Bowles | G06K 9/00087 |
| 2016/0322065 | A1* | 11/2016 | Shimoji | G10L 25/63 |
| 2017/0060231 | A1* | 3/2017 | Kim | G06F 3/167 |
| 2018/0218641 | A1* | 8/2018 | Cruz | G09B 21/003 |
| 2018/0276281 | A1* | 9/2018 | Asukai | G06K 9/00677 |

OTHER PUBLICATIONS

Murray, Lauren, Philip Hands, Ross Goucher, and Juan Ye. "Capturing social cues with imaging glasses." In Proceedings of the 2016 ACM International Joint Conference on Pervasive and Ubiquitous Computing: Adjunct, pp. 968-972. ACM, 2016. (Year: 2016).*

Buimer, Hendrik P., Marian Bittner, Tjerk Kostelijk, Thea M. van der Geest, Richard JA van Wezel, and Yan Zhao. "Enhancing emotion recognition in VIPs with haptic feedback." In International Conference on Human-Computer Interaction, pp. 157-163. Springer, Cham, 2016. (Year: 2016).*

Astler, Douglas, Harrison Chau, Kailin Hsu, Alvin Hua, Andrew Kannan, Lydia Lei, Melissa Nathanson et al. "Facial and expression recognition for the blind using computer vision." 2012. <https://drum.lib.umd.edu/handle/1903/12489> (Year: 2012).*

Kimura, Satoshi, and Masahiko Yachida. "Facial expression recognition and its degree estimation." In Proceedings of IEEE Computer Society Conference on Computer Vision and Pattern Recognition, pp. 295-300. IEEE, 1997. (Year: 1997).*

Google Glass is helping autistic children socialise: Gadget reads other people's emotions and facial expressions; http://www.dailymail.co.uk.science/article-3655652/Can-Google-Glass-helpautistic-children-read-faces.html; Published/Accessed: Jun. 23, 2016.

Vibro: An Assistive Technology Aid for Conveying Facial Expressions; https://sbala.org/projects/vibroglove/chi2010.pdf; Published/Accessed: Apr. 12-13, 2010.

* cited by examiner

SMART NECKLACE FOR SOCIAL AWARENESS

TECHNICAL FIELD

The present disclosure generally relates to devices for providing feedback and, more specifically, to devices that provide feedback based on one or more identifying characteristics of a subject proximate to the device and/or a level of a facial expression of the subject.

BACKGROUND

A person with impaired vision may not be able to recognize a facial expression of a person near to him or her. Similarly, a person on the autism spectrum may not be able to properly interpret a facial expression of a person near to him or her. Facial expressions can vary depending on people. For example, a smiling facial expression of person A is different from a smiling facial expression of person B. It may be desirable to provide facial expression recognition that depends on a subject being analyzed. In addition, it may be desirable to provide information on the level of a facial expression made by a person.

Accordingly, a need exists for devices that provide feedback based on the identifying characteristic of a person and/or the level of a facial expression of a person.

SUMMARY

In one embodiment, a device for providing feedback includes an imaging device configured to capture an image of a subject, a feedback device, and a controller communicatively coupled to the imaging device and the feedback device. The controller includes at least one processor and at least one memory storing computer readable and executable instructions that, when executed by the processor, cause the controller to determine one or more identifying characteristics of the subject, set one or more parameters for determining a facial expression of the subject in the image based on the one or more identifying characteristics of the subject, determine the facial expression of the subject in the image based on the one or more parameters, and provide the feedback with the feedback device based on the determined facial expression.

In another embodiment, a device for providing a feedback includes an imaging device configured to capture an image of a face of a subject, a feedback device, and a controller communicatively coupled to the imaging device and the feedback device. The controller includes at least one processor and at least one memory storing computer readable and executable instructions that, when executed by the processor, cause the controller to process the image of the face to determine one or more facial expression parameters, determine an emotion of the face based on the one or more facial expression parameters, classify the emotion as a positive emotion or a negative emotion, send to the feedback device an instruction for vibrating a first side of the device with the feedback device in response to the emotion being classified as the positive emotion, and send to the feedback device an instruction for vibrating a second side of the device with the feedback device in response to the emotion being classified as the negative emotion.

In another embodiment, a method for providing a feedback includes capturing an image of a subject, determining one or more identifying characteristics of the subject, setting one or more parameters for determining a facial expression of the subject based on the one or more identifying characteristics of the subject, determining the facial expression of the subject in the image based on the one or more parameters, and providing, by the processor, the feedback with a feedback device based on the determined facial expression.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
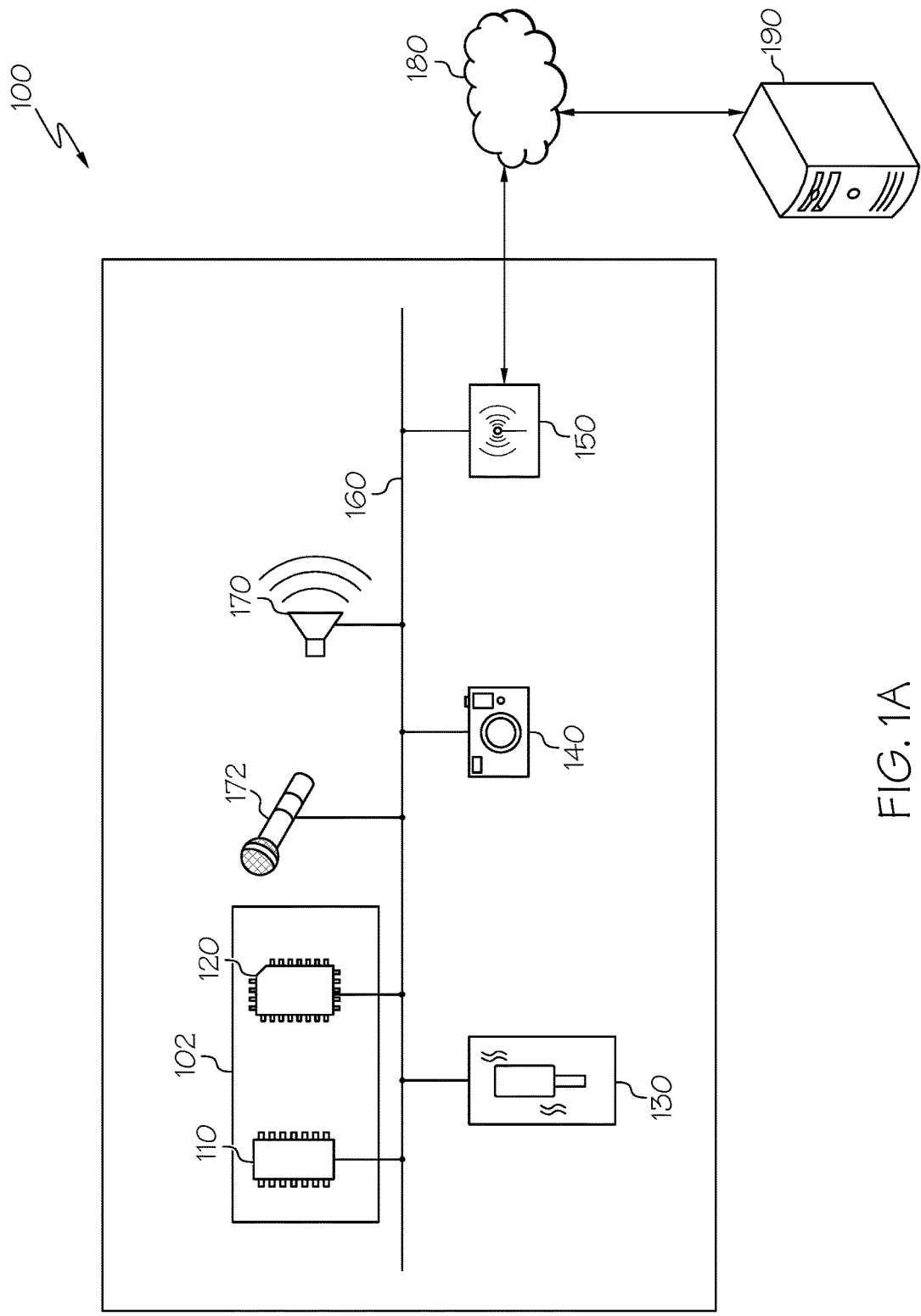
FIG. 1A schematically depicts an exemplary embodiment of various electronic components of a device for providing feedback to a user in accordance with one or more embodiments shown and described herein.

The embodiments disclosed herein include devices that provide feedback that is determined based on one or more identifying characteristics of a subject, and vary feedback based on the type and/or level of a facial expression of a person. Referring generally to FIG. 1A, a device for providing feedback includes an imaging device configured to capture an image of a subject, a feedback device, and a controller communicatively coupled to the imaging device and the feedback device. The controller includes at least one processor and at least one memory storing computer readable and executable instructions that, when executed by the processor, cause the controller to determine one or more identifying characteristics of the subject, set one or more parameters for determining a facial expression of the subject in the image based on the one or more identifying characteristics of the subject, determine the facial expression of the subject in the image based on the one or more parameters, and provide the feedback with the feedback device based on the determined facial expression.

Some assisting devices do not provide varying haptic feedback depending on the identity of a person proximate to the devices. In addition, the conventional vision assist devices do not provide information on the level of a facial expression made by a person. For example, a user of the conventional assisting device cannot recognize a level of smiling of a person in front of the user. The embodiments described herein overcome these limitations by providing varying feedback based on a level of a facial expression of a person.

Referring now to the drawings, FIG. 1A schematically depicts an exemplary embodiment of a device 100 for providing feedback to a user in accordance with one or more embodiments shown and described herein. The feedback may be a tactile feedback, an audible feedback, a visual feedback, etc. The device 100 may be a smart device including, not limited to, a smart necklace device, a smart glasses, a smart helmet, a smart earring, etc. The device 100 includes a controller 102, a feedback device 130, an imaging device 140, network interface hardware 150, a communication path 160, an audible feedback device 170, and a microphone 172. The various components of the device 100 will now be described.

The controller 102 includes a processor 110 and a non-transitory electronic memory 120 to which various components are communicatively coupled, as will be described in further detail below. In some embodiments, the processor 110 and the non-transitory electronic memory 120 and/or the other components are included within a single device. In other embodiments, the processor 110 and the non-transitory electronic memory 120 and/or the other components may be distributed among multiple devices that are communicatively coupled.

The device 100 includes the non-transitory electronic memory 120 that stores a set of machine readable instructions. The processor 110 executes the machine readable instructions stored in the non-transitory electronic memory 120. The non-transitory electronic memory 120 may comprise RAM, ROM, flash memories, hard drives, or any device capable of storing machine readable instructions such that the machine readable instructions can be accessed by the processor 110. The machine readable instructions comprise logic or algorithm(s) written in any programming language of any generation (e.g., 1GL, 2GL, 3GL, 4GL, or 5GL) such as, for example, machine language that may be directly executed by the processor 110, or assembly language, object-oriented programming (OOP), scripting languages, microcode, etc., that may be compiled or assembled into machine readable instructions and stored in the non-transitory electronic memory 120. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The non-transitory electronic memory 120 may be implemented as one memory module or a plurality of memory modules.

In some embodiments, the non-transitory electronic memory 120 includes instructions for executing the functions of the device 100. The instructions may include instructions for determining a type of a facial expression, instructions for determining a level of a facial expression, instructions for determining a pattern of feedback, and instructions for determining an intensity of feedback. The instructions for determining type of a facial expression, when executed by the processor 110, may determine a type of a facial expression of a captured image. The types of facial expressions may include happy, smile, sad, surprise, angry, fear, disgust, etc. The instructions for determining a type of a facial expression may include an image recognition algorithm.

The instructions for determining the level of a facial expression, when executed by the processor 110, may determine a level of a facial expression of a captured image. For example, once the type of a facial expression is determined as a smiling facial expression, the instructions for determining a level of a facial expression may determine the level of smiling of the facial expression. The level may indicate between 0% and 100%. The level of smiling will be described in further detail below with reference to FIG. 2.

The instructions for determining a pattern of feedback, when executed by the processor 110, may determine a pattern of feedback based on a type of a facial expression. For example, different patterns of feedback may be used for different facial expressions, such as smiling and angry facial expressions. The instructions for determining an intensity of feedback, when executed by the processor 110, may determine an intensity of feedback based on the level of a facial expression. For example, the intensity of vibration feedback of the device 100 may be proportional to the level of a facial expression. The functionality of each of these instructions will be described in further detail below.

The processor 110 may be any device capable of executing machine readable instructions. For example, the processor 110 may be an integrated circuit, a microchip, a computer, or any other computing device. The non-transitory electronic memory 120 and the processor 110 are coupled to the communication path 160 that provides signal interconnectivity between various components and/or modules of the device 100. Accordingly, the communication path 160 may communicatively couple any number of processors with one another, and allow the modules coupled to the communication path 160 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 160 may be formed from any medium that is capable of transmitting a signal such as, for example, conductive wires, conductive traces, optical waveguides, or the like. Moreover, the communication path 160 may be formed from a combination of mediums capable of transmitting signals. In some embodiments, the communication path 160 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As schematically depicted in FIG. 1A, the communication path 160 communicatively couples the processor 110 and the non-transitory electronic memory 120 with a plurality of other components of the device 100. For example, the device 100 depicted in FIG. 1A includes the processor 110 and the non-transitory electronic memory 120 communicatively coupled with the feedback device 130, the imaging device 140, the network interface hardware 150, the audible feedback device 170, and the microphone 172.

The feedback device 130 may be any device capable of providing feedback to a user. The feedback device 130 may include a vibration device (such as in embodiments in which feedback is delivered through vibration), an air blowing device (such as in embodiments in which feedback is delivered through a puff of air), or a pressure generating device (such as in embodiments in which the feedback is delivered through generated pressure). In some embodiments, the feedback device 130 comprises an array of feedback devices that provide the user with more detailed feedback. For example, an array (e.g., a 2×2 array or 3×3 array) of feedback devices can provide different types of feedback to the user. For example, feedback received on a left side of a user may indicate one type of a facial expression, such as a smiling facial expression, and feedback received on a right side of a user may indicate another type of a facial expression, such as an angry facial expression. In some embodiments, the feedback device 130 is wearable on the user, for example as a necklace, a belt, a wristband, a waist-pack, an adhesive, or a button. In some embodiments, the feedback device 130 is located in a device separate from some or all of the other components of the device 100 and communicatively coupled with the device 100.

The imaging device 140 is coupled to the communication path 160 and communicatively coupled to the processor 110. The imaging device 140 may be any device having one or more sensing devices (e.g., pixels) capable of detecting radiation in an ultraviolet wavelength band, a visible light wavelength band, or an infrared wavelength band. The imaging device 140 may have any resolution. The imaging device 140 may include an omni-directional camera, or a panoramic camera. In some embodiments, one or more optical components, such as a mirror, fish-eye lens, or any other type of lens may be optically coupled to the imaging device 140. The imaging device 140 may be used to capture an image of a subject proximate to a user of the device 100.

The device 100 includes network interface hardware 150 for communicatively coupling the device 100 to a server 190 (e.g., an image storage server). The network interface hardware 150 can be communicatively coupled to the communication path 160 and can be any device capable of transmitting and/or receiving data via a network. Accordingly, the network interface hardware 150 can include a communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 150 includes hardware configured to operate in accordance with the Bluetooth wireless communication protocol. Some embodiments may not include the network interface hardware 150.

The audible feedback device 170 may be any device capable of providing audible feedback to a user. The audible feedback device 170 may include a speaker, headphones, or the like. In some embodiments, the audible feedback may be delivered to the user with the speaker or headphones in a 3-dimensional (3D) audio placement format. In some embodiments, the audible feedback device 170 is integral with the device 100, as depicted in FIG. 1A. In further embodiments, the audible feedback device 170 is located in a device separate from some or all of the other components of the device 100 and communicatively coupled with the device 100. In some embodiments, the audible feedback device 170 is not included in the device 100.

The microphone 172 is coupled to the communication path 160 and communicatively coupled to the processor 110. The microphone 172 may receive acoustic vibrations from a person proximate to the device 100 and transform the acoustic vibrations into an electrical signal indicative of the sound. The electrical signal indicative of the sound may be assessed to determine an identity of a subject and/or one or more speech parameters, as explained below.

The device 100 may be communicatively coupled to the server 190 by a network 180. In one embodiment, the network 180 may include one or more computer networks (e.g., a personal area network, a local area network, or a wide area network), cellular networks, satellite networks and/or a global positioning system and combinations thereof. Accordingly, the device 100 can be communicatively coupled to the network 180 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM.

While FIG. 1A depicts the processor 110, the non-transitory electronic memory 120, the feedback device 130, the imaging device 140, and the audible feedback device 170 and the microphone 172 in a single, integral device 100, it should be understood that one or more of these components may be distributed among multiple devices in a variety of configurations.

Figure 1B:
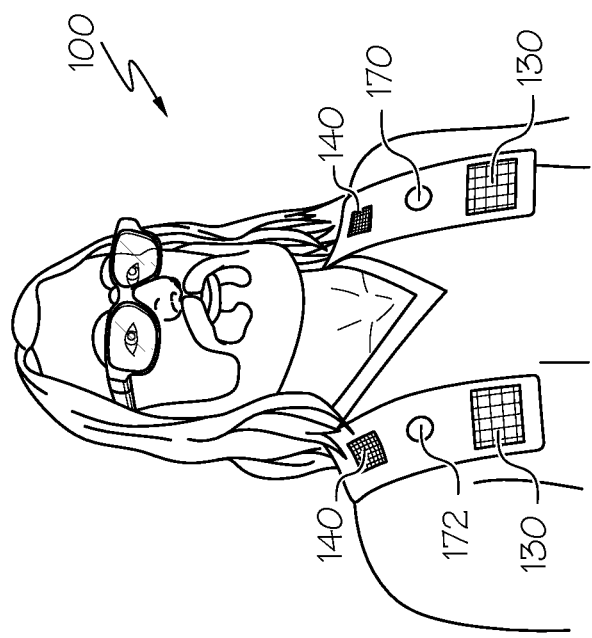
FIG. 1B depicts a front view of a device in accordance with one or more embodiments shown and described herein.

FIG. 1B depicts a front view of the device in FIG. 1A according to one or more embodiments shown and described herein. The device 100 may be a smart necklace. In FIG. 1B, the device 100 includes two feedback devices 130, two imaging devices 140, the audible feedback device 170 and the microphone 172. While FIG. 1B depicts two feedback devices 130 and two imaging devices 140 of the device 100, the device 100 may include more than two or less than two feedback devices 130 or imaging devices 140.

Figure 2:
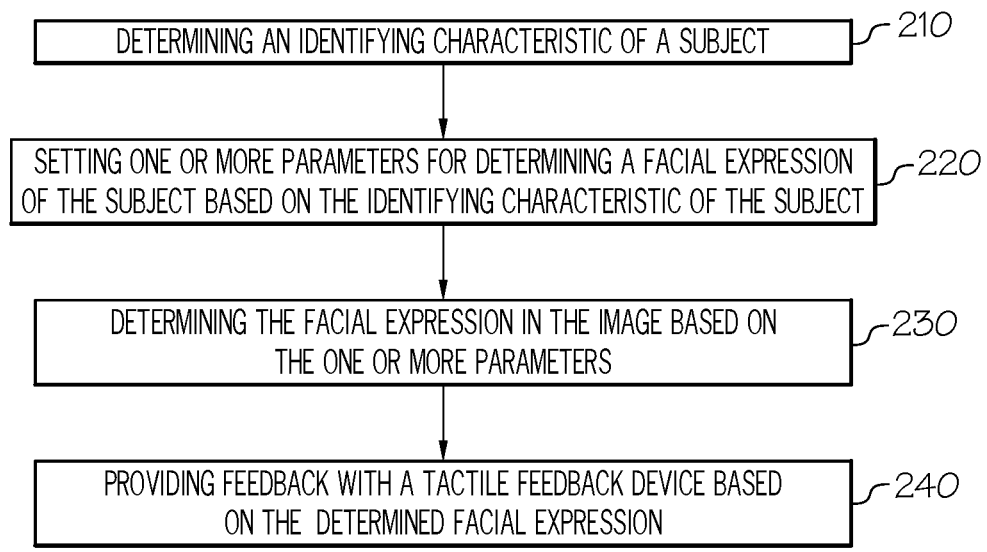
FIG. 2 depicts a flow chart of a method for providing feedback using a device in accordance with one or more embodiments shown and described herein.

FIG. 2 depicts a flow chart of a method for providing feedback using a device in accordance with one or more embodiments shown and described herein. In step 230, the processor 110 of the device 100 determines one or more identifying characteristics of the subject. In some embodiment, the processor 110 may determine the one or more identifying characteristics of the subject based on an image of the subject captured by the imaging device 140. The processor 110 of the device 100 may implement image an recognition algorithm on the face in the captured image to obtain one or more identifying characteristics of the subject. The one or more identifying characteristics of the subject may include an identity, a gender, an age, a ethnicity or cultural background, etc. In another embodiment, the processor 110 of the device 100 determines one or more identifying characteristics of the subject based on the electrical signal output by the microphone 172.

In step 220, the processor 110 of the device 100 sets one or more parameters for determining a facial expression of the subject based on the one or more identifying characteristics of the subject determined in step 210. The one or more parameters may include parameters for common facial features including, but not limited to, parameters for teeth, parameters for eyes, parameters for an outer lip, parameters for a curvature of the face, etc. The processor 110 may set one or more parameters for determining a facial expression based on an identity of the subject. For example, if the processor 110 identifies the subject as a person A, then the processor 110 may set one or more parameters for determining a facial expression with respect to the person A. The setting of one or more parameters may include parameters associated with the person A's smiling facial expression, parameters associated with the person A's angry facial expression, etc.

In some embodiments, one or more parameters for determining a facial expression for the subject may be retrieved from the non-transitory electronic memory 120. For example, if the processor 110 identifies the subject as the person A, the processor 110 may retrieve parameters associated with the person A's various expressions, such as a smiling facial expression, an angry expression, etc. from the non-transitory electronic memory 120. In another embodiment, one or more parameters for determining a facial expression for the subject may be retrieved from the server 190. For example, if the processor 110 identifies the subject as the person B, the processor 110 may retrieve parameters associated with the person B's various expressions, such as a smiling facial expression, an angry expression, etc. from the server.

The processor 110 may set one or more parameters for determining a facial expression based on a gender of the subject. For example, if the processor 110 determines that the subject is a female, then the processor 110 may set one or more parameters for determining a facial expression of a female. The set one or more parameters may include parameters associated with average female's smiling facial expression, parameters associated with female's angry facial expression, etc. These parameters may be pre-stored in the non-transitory electronic memory 120 or the server 190 and the processor 110 may receive the parameters from the non-transitory electronic memory 120 or the server 190.

The processor 110 may set one or more parameters for determining a facial expression based on an age of the subject. For example, if the processor 110 determines that the subject is a teenager, then the processor 110 may set one or more parameters for determining a facial expression of a teenager. The set one or more parameters may include parameters associated with average teenager's smiling facial expression, parameters associated with average teenager's angry facial expression, etc. These parameters may be pre-stored in the non-transitory electronic memory 120 or the server 190 and the processor 110 may receive the parameters from the non-transitory electronic memory 120 or the server 190.

The processor 110 may set one or more parameters for determining a facial expression based on an ethnicity or cultural background of the subject. For example, if the processor 110 determines that the subject is a person from ethnicity or cultural background A, then the processor 110 may set one or more parameters for determining a facial expression of a person from ethnicity or cultural background A. The set one or more parameters may include parameters associated with average person from ethnicity or cultural background A's smiling facial expression, parameters associated with average person from ethnicity or cultural background A's angry facial expression, etc. These parameters may be pre-stored in the non-transitory electronic memory 120 or the server 190 and the processor 110 may receive the parameters from the non-transitory electronic memory 120 or the server 190.

In step 230, the processor 110 of the device 100 determines the facial expression of the subject in the image based on the one or more parameters set in step 220. The processor may implement a facial expression recognition algorithm on the captured image to determine a facial expression in the image. The facial expression recognition algorithm employs the one or more parameters set in step 220. For example, when the subject is determined as a female at the age of 50 in step 220, the processor 110 implements the facial expression recognition algorithm using parameters for determining a facial expression of a female at the age of 50. The parameters for determining a facial expression of a female at the age of 50 may determine the facial expression of the captured subject more accurately than parameters for determining a facial expression of general people. For example, the processor 110 may determine that a facial expression in the image is a smiling facial expression by implementing the facial expression recognition algorithm using parameters for determining a facial expression of a female at the age of 50. In contrast, the processor 110 may not accurately determine that a facial expression in the image is a smiling facial expression by implementing the facial expression recognition algorithm using parameters for determining a facial expression of general people because the parameters are not finely tuned to a female at the age of 50.

In some embodiments, when the subject is determined as a person A in step 220, the processor 110 implements the facial expression recognition algorithm using parameters for determining a facial expression of person A. The parameters for determining a facial expression of person A may determine the facial expression of person A more accurately than parameters for determining a facial expression of general people. For example, the processor 110 may determine that a facial expression in the image is an angry facial expression by implementing the facial expression recognition algorithm using parameters for determining a facial expression of person A. In contrast, the processor 110 may not accurately determine that a facial expression in the image is an angry facial expression by implementing the facial expression recognition algorithm using parameters for determining a facial expression of general people because the parameters are not finely tuned to person A.

In step 240, the feedback device 130 provides feedback based on the facial expression. The device 100 may be configured to recognize the type of a facial expression and the level of a facial expression. In one embodiment, the device 100 may provide different patterns of vibration depending on the type of a facial expression. For example, the device 100 may provide a pattern A of vibration when it is determined that the type of a facial expression in the captured image is a smiling facial expression, and provide a pattern B of vibration when it is determined that the type of a facial expression in the captured image is an angry facial expression. The pattern A may be different from the pattern B. For example, the vibration pattern A may be a continuous vibration for a predetermined time and the vibration pattern B may be an intermittent vibration. In another embodiment, the device 100 may use different vibration patterns that correspond to Morse code. For example, the device 100 may provide a vibration pattern corresponding to Morse code A when it is determined that the type of a facial expression in the captured image is smiling, and provide a vibration pattern corresponding to Morse code B when it is determined that the type of a facial expression in the captured image is an angry facial expression.

Figure 3:
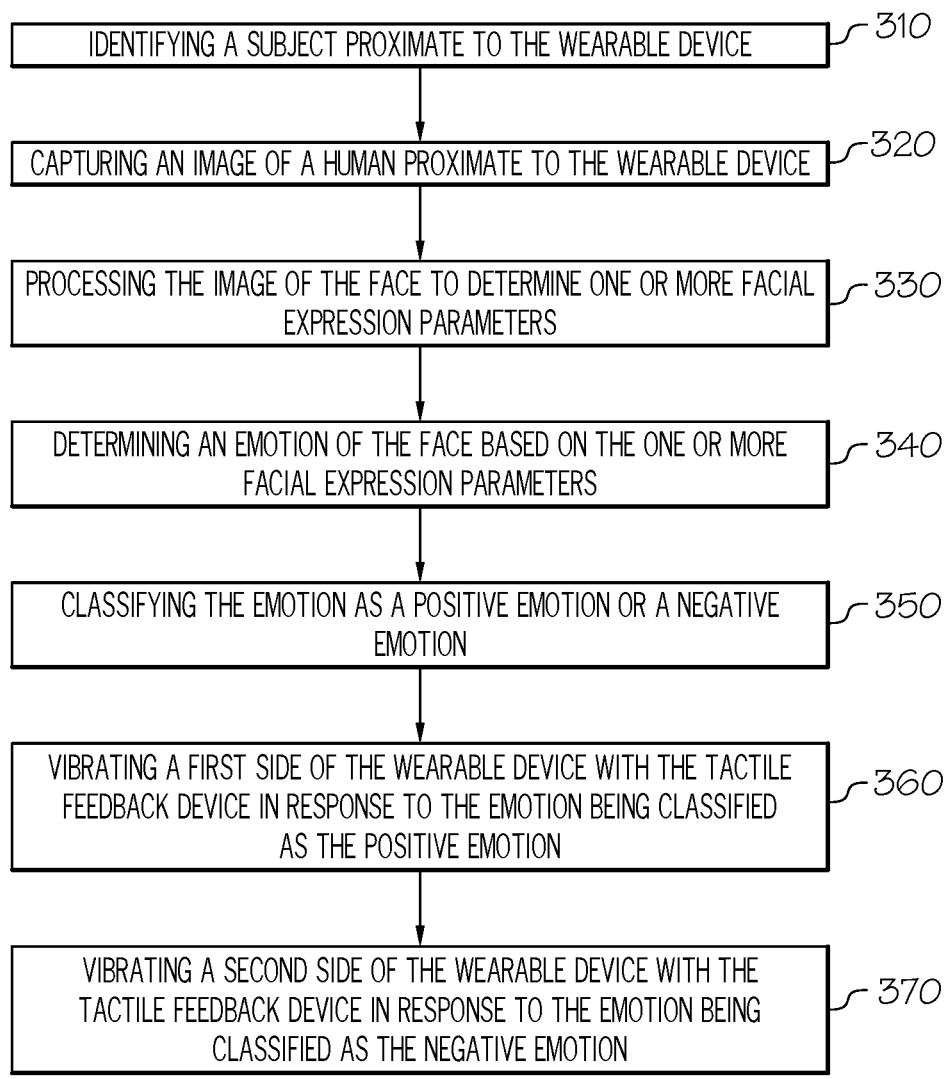
FIG. 3 depicts a flow chart of a method for providing feedback using a device in accordance with another embodiment shown and described herein.

FIG. 3 depicts a flow chart of a method for providing feedback using a device in accordance with another embodiment shown and described herein. In step 310, the imaging device 140 of the device 100 identifies a subject proximate to the device 100. The imaging device 140 may be operable to sense the location and movement of the subject. The imaging device 140 can locate the subject as a whole or can locate more specific segments of the subject, such as the subject's face.

In step 320, the imaging device 140 captures an image of the face of the subject. For example, the imaging device 140 of the device 100 may take a photo of a face of a person locating in front of the device 100. The processor 110 of the device 100 may implement an image recognition algorithm on the captured image to identify the person. For example, a face recognition algorithm or other conventional image recognition algorithm may be used to determine an identity of the subject. In another embodiment, the imaging device 140 may capture a gesture of the subject. For example, the imaging device 140 may capture a hand gesture, a shoulder gesture, a head gesture (e.g., nodding), etc.

In step 330, the processor 110 of the device 100 processes the captured image to determine one or more facial expression parameters. The one or more facial expression parameters may include parameters for common facial features including, but not limited to, parameters for teeth, parameters for eyes, parameters for an outer lip, parameters for a curvature of the face, etc. The facial expression parameters may be stored in the non-transitory electronic memory 120 in association with the identity of the subject. The parameters for teeth may include a value proportional to the number of teeth shown in the captured image. The parameters for teeth may also include a value related to the size of teeth exposed in the captured image. The parameters for eyes may include a degree of opening of the eyes, the contour of the eyes, etc. The parameters for an outer lip may include a degree of opening of the outer lip, the contour of the outer lip, etc.

In another embodiment, the processor 110 of the device 100 may process the captured image to determine one or more gesture parameters. The one or more gesture parameters may include parameters for hand gesture, parameters for shoulder gesture, parameters for head gesture. The one or more gesture parameters may be stored in the non-transitory electronic memory 120 in association with the identity of the subject.

In step 340, the processor 110 determines an emotion of the face based on the one or more facial expression parameters. In one embodiment, the processor 110 may compare the one or more facial expression parameters with predetermined facial expression parameters associated with various emotions, such as happy, smiling, sad, surprise, angry, fear, disgust, etc. For example, the processor 110 may determine that the emotion of the captured image is happy, if the one or more facial expression parameters are closest to predetermined parameters associated with the happy emotion among predetermined parameters associated with various emotions. The emotion of the face may be stored in the non-transitory electronic memory 120 along with the one or more facial expression parameters and/or the identity of the subject.

In some embodiments, the processor 110 may retrieve facial expression parameters associated with the subject that were previously stored in the non-transitory electronic memory 120. For example, when the imaging device 140 captures an image of a person A's face and determines the identification of the person A, the processor 110 may retrieve facial expression parameters associated with the person A's happy emotion, facial expression parameters associated with angry emotion, facial expression parameters associated with the person A's sad emotion, etc. from the non-transitory electronic memory 120. Then, the processor 110 may compare facial expression parameters of the captured image with facial expression parameters retrieved from the non-transitory electronic memory 120. If the facial expression parameters of the captured image are closest to facial expression parameters associated with the person A's sad emotion among the retrieved facial expression parameters, the processor 110 determines that the type of the facial expression of the captured image is a sad emotion. Similarly, if the facial expression parameters of the captured image are closest to facial expression parameters associated with the person A's angry emotion among the retrieved facial expression parameters, the processor 110 determines that the type of the facial expression of the captured image is an angry emotion.

In another embodiment, the processor 110 may retrieve facial expression parameters associated with the subject from the server 190 via the network 180. The server 190 may store facial expression parameters in association with an identity of a subject and a type of emotion. For example, when the imaging device 140 captures an image of a person B's face and determines the identification of the person B, the processor 110 may retrieve facial expression parameters associated with the person B's happy emotion, facial expression parameters associated with the person B's angry emotion, facial expression parameters associated with the person B's sad emotion, etc. from the server 190. Then, the processor 110 may compare facial expression parameters of the captured image with facial expression parameters retrieved from the server 190. If the facial expression parameters of the captured image are closest to facial expression parameters associated with the person B's surprise emotion among the retrieved facial expression parameters, the processor 110 determines that the type of the facial expression of the captured image is a surprise emotion.

In step 350, the processor 110 classifies the emotion as a positive emotion or a negative emotion. For example, if the processor 110 determines that the emotion of the captured face is happy emotion, the processor classifies the emotion as a positive emotion. If the processor 110 determines that the emotion of the captured face is sad emotion, the processor classifies the emotion as a negative emotion.

In step 360, the feedback device 130 vibrates a first side of the device when the processor 110 determines that the emotion of the captured face is a positive emotion. The intensity of vibration may be determined based on the level of a facial expression. The processor 110 determines a level of the facial expression of the captured image based on the one or more facial expression parameters. The processor 110 may compare the one or more facial expression parameters of the captured image with facial expression parameters associated with various levels of a facial expression. The facial expression parameters associated with various levels of a facial expression, e.g., a smiling facial expression, may be stored in the non-transitory electronic memory 120. In one embodiment, facial expression parameters associated with 0% of smiling up to 100% of smiling with an increment of a certain percentage (e.g., 10%) may be stored in the non-transitory electronic memory 120. The facial expression parameters stored in the non-transitory electronic memory 120 may be associated with the identity of a person. If the facial expression parameters associated with a certain level of smiling are closest to the one or more facial expression parameters of the captured image, the processor 110 may determine that certain level as the level of the facial expression for the captured image. For example, the processor 110 may calculate deviations between the one or more facial expression parameters of the captured image and facial expression parameters associated with various levels of smiling. If the deviation between the one or more facial expression parameters of the captured image and the facial expression parameters associated with 50% of smiling is the smallest, the processor 110 may determine that the level of smiling for the captured image is 50% of smiling.

In another embodiment, facial expression parameters associated with 0% of an angry facial expression up to 100% of an angry facial expression with an increment of a certain percentage (e.g., 20%) may be stored in the server 190. The processor 110 may determine facial expression parameters associated with a certain level of an angry facial expression that are closest to the one or more facial expression parameters of the captured image. For example, the processor 110 may calculate deviations between the one or more facial expression parameters of the captured image and angry facial expression parameters associated with different levels of a facial expression. If the deviation between the one or more facial expression parameters of the captured image and facial expression parameters associated with 100% of an angry facial expression is the smallest, the processor 110 may determine that the level of angry facial expression for the captured image is 100% of an angry facial expression.

The vibration intensity of the feedback device 130 may be proportional to the level of the facial expression. For example, the processor 110 may determine the vibration intensity of the feedback device 130 as 50% of the maximum vibration intensity if the determined level of smiling is 50%, and determine the vibration intensity of the feedback device 130 as 100% of the maximum vibration intensity if the determined level of smiling is 100%. In another example, the processor 110 may determine the vibration intensity of the feedback device 130 as 30% of the maximum vibration intensity if the determined level of angry facial expression is 30%.

In some embodiments, the processor 110 may determine a vibration intensity of the feedback device 130 further based on speech parameters including a volume of speech from the microphone 172. For example, the processor 110 may determine a vibration intensity of the feedback device 130 based on a weighted average of the level of the facial expression and the level of volume of speech. If the level of smiling is 70% and the level of volume of speech is 30%, the vibration intensity of the feedback device 130 may be calculated as $\alpha \times 0.7 + (1-\alpha) \times 0.3$. The parameter $\alpha$ may be a predetermined value.

In step 370, the feedback device 130 vibrates a second side of the device when the processor 110 determines that the emotion of the captured face is a negative emotion. Similar to step 360, the intensity of vibration may be determined based on the level of a facial expression.

Figure 4A:
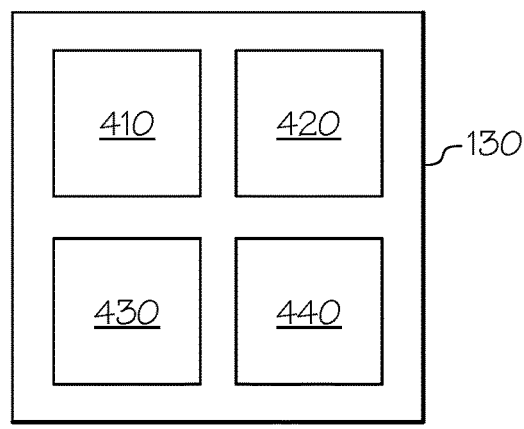
FIG. 4A schematically depicts an array of a feedback device in accordance with one or more embodiments described and shown herein.

FIG. 4A schematically depicts an array of the feedback device 130 of the device 100 in accordance with one or more embodiments described and shown herein. The feedback device 130 may include an array of vibrating devices. For example, the feedback device 130 may include 2×2 array of vibrating devices 410, 420, 430 and 440. The feedback device 130 may provide the user more detailed information about a type of a facial expression and a level of a facial expression. The processor 110 may signal feedback using the array to provide feedback depending on the type of a facial expression.

Figure 4B:
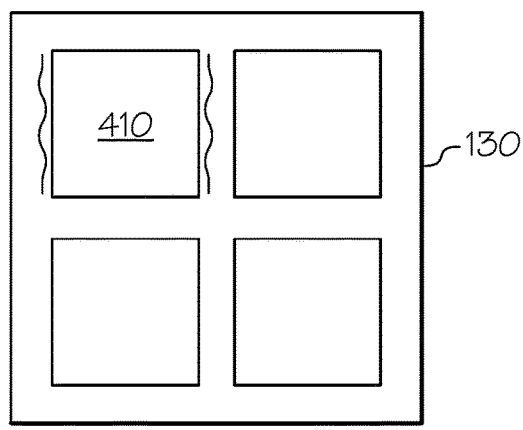
FIG. 4B schematically depicts a vibrating pattern of an array of the feedback device in accordance with one or more embodiments described and shown herein.
Figure 4C:
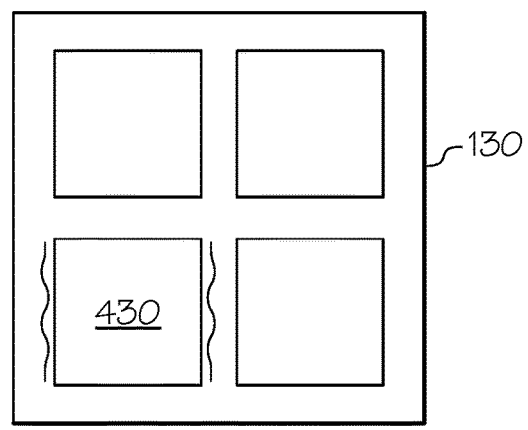
FIG. 4C schematically depicts a vibrating pattern of an array of the feedback device in accordance with one or more embodiments described and shown herein.
Figure 4D:
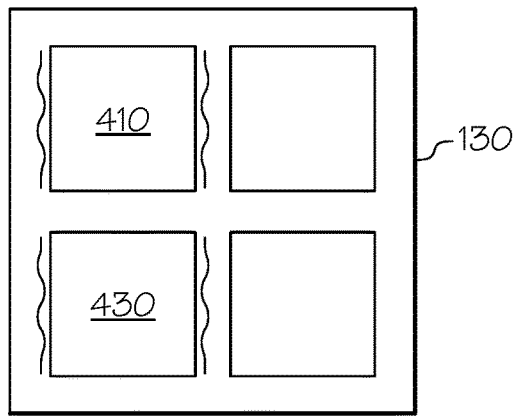
FIG. 4D schematically depicts a vibrating pattern of an array of the feedback device in accordance with one or more embodiments described and shown herein.

FIGS. 4B-4G schematically depict the feedback device 130 providing different types of feedback in accordance with one or more embodiments shown and described herein. The processor 110 may signal different feedback based on whether the emotion of the face is a positive emotion or a negative emotion. If the emotion of the face is a positive emotion, one or more vibrating devices on the left side of the feedback device 130 may vibrate. For example, when the determined emotion of a captured image is happiness, the processor 110 may determine the emotion as positive, and send to the feedback device 130 a signal for activating the vibrating device 410 as shown in FIG. 4B. Such feedback may inform the user that the person proximate to the user is happy. When the determined emotion of a captured image is calmness, the processor 110 may determine the emotion as positive, and send to the feedback device 130 a signal for activating the vibrating device 430 as shown in FIG. 4C. When the determined emotion of a captured image is happiness and love, the processor 110 may determine the emotion as positive, and send to the feedback device 130 a signal for activating the vibrating devices 410 and 430 as shown in FIG. 4D.

Figure 4E:
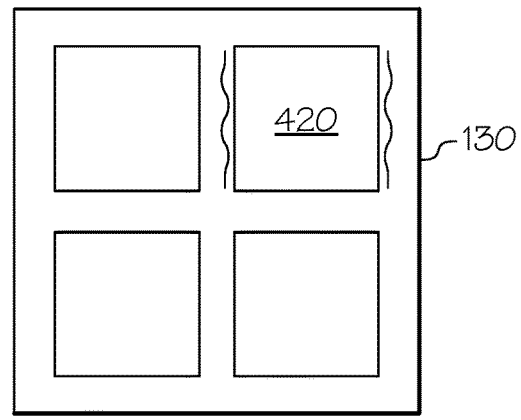
FIG. 4E schematically depicts a vibrating pattern of an array of the feedback device in accordance with one or more embodiments described and shown herein.
Figure 4F:
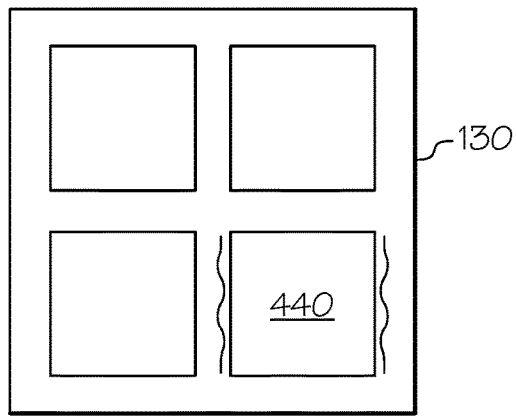
FIG. 4F schematically depicts a vibrating pattern of an array of the feedback device in accordance with one or more embodiments described and shown herein.
Figure 4G:
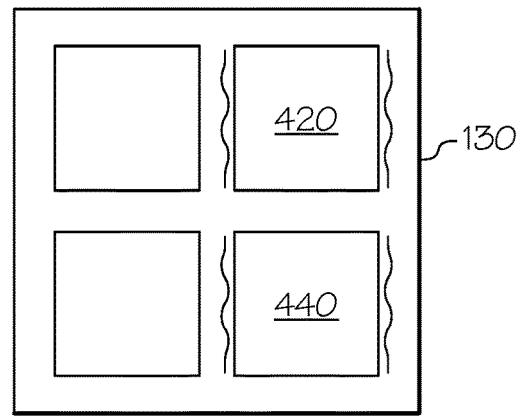
FIG. 4G schematically depicts a vibrating pattern of an array of the feedback device in accordance with one or more embodiments described and shown herein.

If the emotion of the face is a negative emotion, one or more vibrating devices on the right side of the feedback device 130 may vibrate. For example, when the determined emotion of a captured image is anger, the processor 110 may determine the emotion as negative, and send to the feedback device 130 a signal for activating the vibrating device 420 as shown in FIG. 4E. Such feedback may inform the user that the person proximate to the user is angry. When the determined emotion of a captured image is sadness, the processor 110 may determine the emotion as negative, and send to the feedback device 130 a signal for activating the vibrating device 440 as shown in FIG. 4F. When the determined emotion of a captured image is anger and sadness, the processor 110 may determine the emotion as negative, and send to the feedback device 130 a signal for activating the vibrating devices 420 and 440 as shown in FIG. 4G. The vibration intensity of each of the vibrating devices 410, 420, 430 and 440 may be proportional to the level of the facial expression.

Figure 5A:
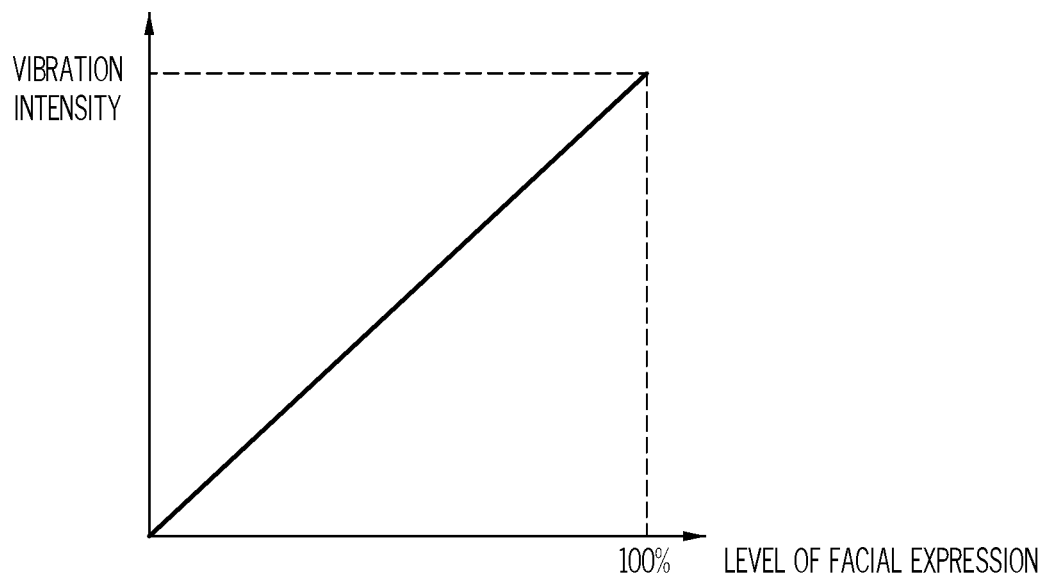
FIG. 5A depicts a graph illustrating a relationship between a level of a facial expression and a vibration intensity of the feedback device in accordance with one or more embodiments shown and described herein.
Figure 5B:
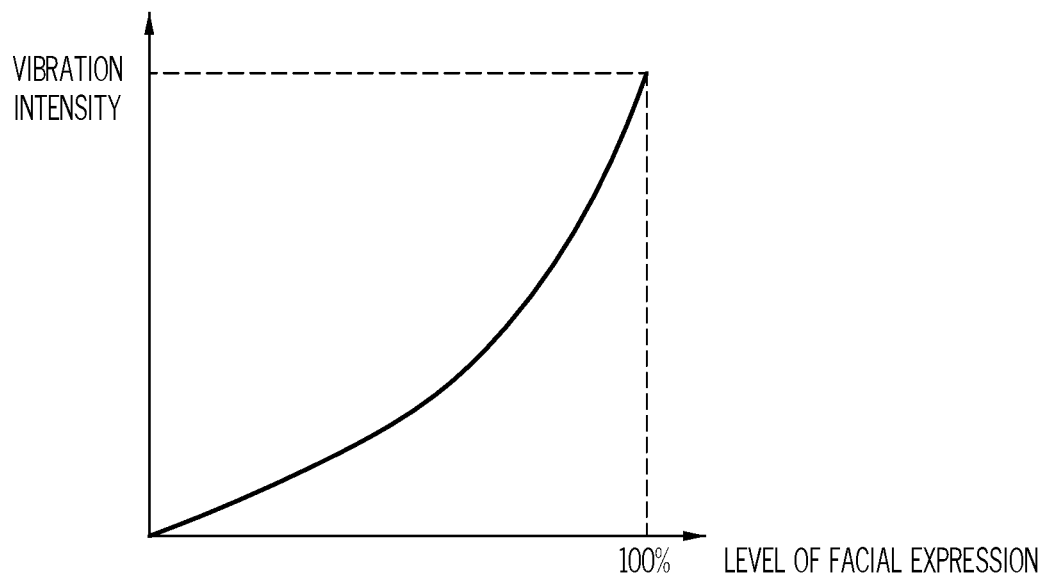
FIG. 5B depicts a graph illustrating a relationship between a level of a facial expression and a vibration intensity of the feedback device in accordance with one or more embodiments shown and described herein.

FIGS. 5A and 5B depict graphs illustrating relationship between a level of a facial expression and a vibration intensity of the feedback device 130. In FIG. 5A, the vibration intensity of the feedback device 130 is linearly proportional to the level of a facial expression. For example, if the level of smiling for a certain image is determined as 50% by the processor 110, the vibration intensity of the feedback device 130 is determined as 50% of the maximum vibration intensity. In FIG. 5B, the vibration intensity of the feedback device 130 is exponentially proportional to the level of a facial expression. In this embodiment, the user of the device 100 may easily recognize a change in the level of a facial expression when the level of a facial expression is more than 50% because the vibration intensity of the feedback device 130 changes more rapidly than the vibration intensity in FIG. 5A.

It should be understood that embodiments described herein are directed to a device that provides feedback that is determined based on one or more identifying characteristics of a subject, and varying feedback based on the type and/or level of a facial expression of a person. The device includes an imaging device configured to capture an image of a subject, a feedback device, and a controller communicatively coupled to the imaging device and the feedback device. The controller includes at least one processor and at least one memory storing computer readable and executable instructions that, when executed by the processors, cause the controller to determine one or more identifying characteristics of the subject based on a face in the image, set one or more parameters for determining a facial expression based on the one or more identifying characteristics of the subject, determine a facial expression in the image based on the one or more parameters, and provide feedback with the feedback device based on the facial expression. The device according to the present disclosure provides more accurate information on a facial expression of a subject by using facial recognition algorithms that are finely tuned according to one or more identifying characteristics of the subject being captured.

It is noted that the terms "substantially" and "proximate" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A device for providing feedback, the device comprising:
   an imaging device configured to capture an image of a subject;
   a feedback device; and
   a controller communicatively coupled to the imaging device and the feedback device, the controller comprising at least one processor and at least one memory storing computer readable and executable instructions that, when executed by the processor, cause the controller to:
   determine one or more identifying characteristics of the subject;
   select, among a plurality of parameters stored in the at least one memory, one or more parameters for determining a facial expression of the subject in the image, the one or more parameters being associated with the one or more identifying characteristics of the subject;
   determine the facial expression of the subject in the image based on the one or more parameters; and
   provide the feedback with the feedback device based on the determined facial expression
   wherein the one or more identifying characteristics includes at least one of a gender, an age, and an ethnicity.

2. The device of claim 1, wherein the computer readable and executable instructions, when executed by the processor, cause the controller to determine the one or more identifying characteristics of the subject based on the image from the imaging device.

3. The device of claim 1, wherein the computer readable and executable instructions, when executed by the processor, cause the controller to provide the feedback with the feedback device further based on the one or more parameters.

4. The device of claim 1, further comprising
   a microphone configured to output an electrical signal indicative of a sound of the subject,
   wherein the computer readable and executable instructions, when executed by the processor, cause the controller to determine the one or more identifying characteristics of the subject further based on the electrical signal output by the microphone.

5. The device of claim 1, wherein the computer readable and executable instructions, when executed by the processor, cause the controller to:
   determine an emotion of the subject based on the facial expression;
   classify the emotion as a positive emotion or a negative emotion;
   send to the feedback device an instruction for vibrating a first side of the device with the feedback device in response to the emotion being classified as the positive emotion; and
   send to the feedback device an instruction for vibrating a second side of the device with the feedback device in response to the emotion being classified as the negative emotion.

6. The device of claim 1, wherein the feedback comprises at least one of vibrations, air puffs, and pressure.

7. The device of claim 1, wherein the feedback comprises a vibration pattern corresponding to Morse code.

8. The device of claim 1, wherein the device for providing the feedback is a smart necklace device.

9. A device for providing a feedback, the device comprising:
   an imaging device configured to capture an image of a face of a subject;
   a feedback device; and
   a controller communicatively coupled to the imaging device and the feedback device, the controller comprising at least one processor and at least one memory storing computer readable and executable instructions that, when executed by the processor, cause the controller to:
   determine one or more identifying characteristics of the subject;
   select, among a plurality of parameters stored in the at least one memory, one or more facial expression parameters for determining a facial expression of the subject, the one or more facial expression parameters being associated with the one or more identifying characteristics of the subject;
   determine a level of a facial expression of an emotion based on the one or more facial expression parameters;

classify the emotion as a positive emotion or a negative emotion;

determine a vibration intensity based on the level of the facial expression;

send to the feedback device an instruction for vibrating a first side of the device at the vibration intensity with the feedback device in response to the emotion being classified as the positive emotion; and send to the feedback device an instruction for vibrating a second side of the device at the vibration intensity with the feedback device in response to the emotion being classified as the negative emotion, wherein the one or more identifying characteristics includes at least one of a gender, an age, and an ethnicity.

10. The device of claim 9, further comprising a microphone configured to output an electrical signal indicative of a sound of the subject, wherein the computer readable and executable instructions, when executed by the processor, cause the controller to determine the emotion further based on the electrical signal from the microphone.

11. The device of claim 9, wherein the feedback device includes an array of vibration devices, and one or more vibration devices located on a first side of the feedback device vibrates in response to the instruction for vibrating the first side of the device.

12. The device of claim 9, wherein the feedback device includes an array of vibration devices, and one or more vibration devices located on a second side of the feedback device vibrates in response to the instruction for vibrating the second side of the device.

13. The device of claim 9, wherein the device for providing the feedback is a smart necklace device.

14. A method for providing a feedback, the method comprising:

capturing, by an imaging device, an image of a subject;

determining, by a processor, one or more identifying characteristics of the subject;

selecting, by the processor, among a plurality of parameters stored in a memory, one or more parameters for determining a facial expression of the subject, the one or more parameters being associated with the one or more identifying characteristics of the subject;

determining, by the processor, the facial expression of the subject in the image based on the one or more parameters; and providing, by the processor, the feedback with a feedback device based on the determined facial expression, wherein the one or more identifying characteristics includes at least one of a gender, an age, and an ethnicity.

15. The method of claim 14, wherein providing the feedback with the feedback device comprises providing the feedback further based on the one or more parameters.

16. The method of claim 14, further comprising:

recording, by a microphone, a speech of the subject; and determining the one or more identifying characteristics of the subject further based on the speech.

17. The method of claim 14, further comprising:

determining, by the processor, an emotion of the subject based on the facial expression;

classifying, by the processor, the emotion as a positive emotion or a negative emotion;

vibrating a first side of a device with the feedback device in response to the emotion being classified as the positive emotion; and vibrating a second side of the device with the feedback device in response to the emotion being classified as the negative emotion.

* * * * *